Sept. 29, 1925.
L. W. CHUBB
1,555,266
PROTECTIVE DEVICE FOR MEASURING INSTRUMENTS
Filed Nov. 16, 1918
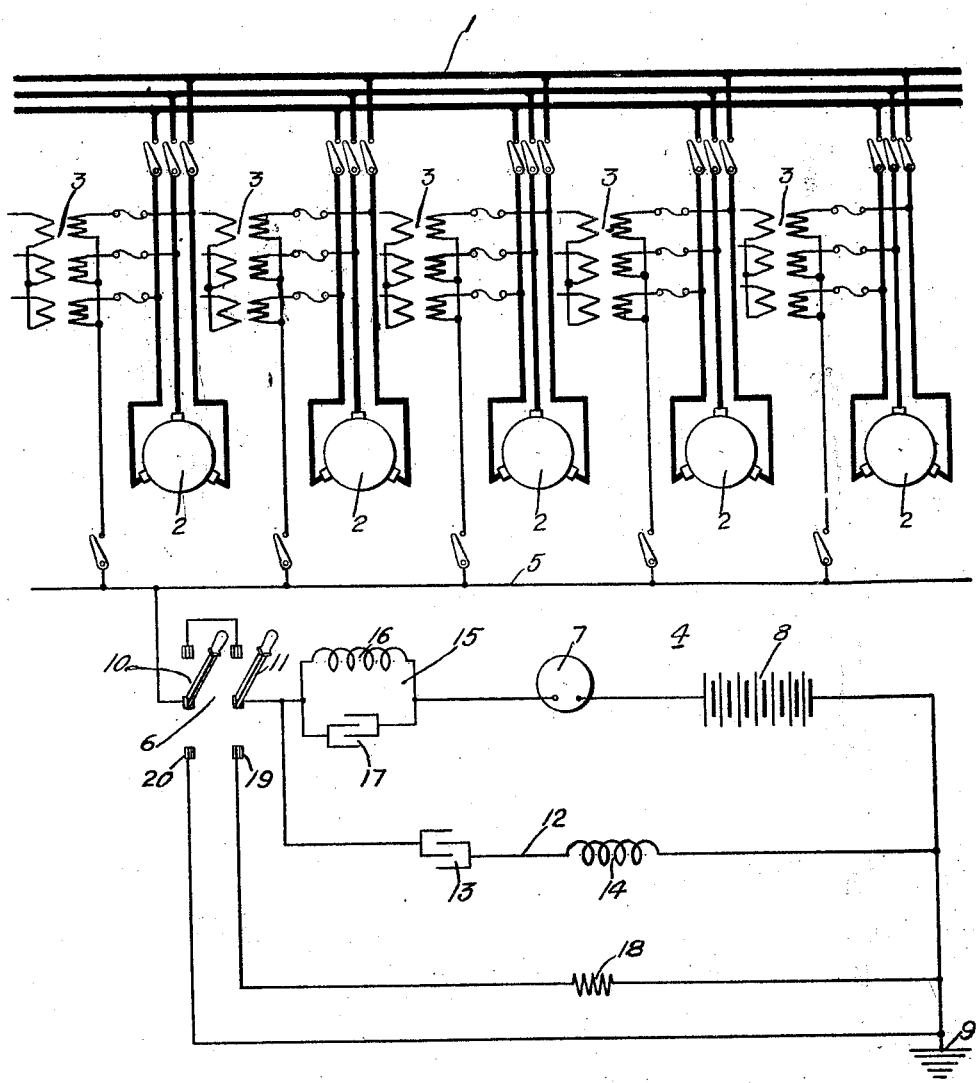
WITNESSES:
INVENTOR
Lewis W. Chubb.
BY
ATTORNEY Patented Sept. 29, 1925.

1,555,266

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

PROTECTIVE DEVICE FOR MEASURING INSTRUMENTS.

Application filed November 16, 1918. Serial No. 262,793.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Protective Devices for Measuring Instruments, of which the following is a specification.

My invention relates to testing systems and particularly to protective devices for insulation-testing instruments.

The object of my invention is to provide means for so protecting a measuring instrument against the destructive effects of high-voltage alternating current that the same may be used to measure the insulation resistance of an operative alternating-current circuit.

In practicing my invention, I provide a milliammeter and a source of direct current for determining the insulation resistance between an alternating-current circuit and ground. In order to prevent the alternating current from traversing the instrument when a ground occurs and to permit the measuring device to be used under normal operating circuit conditions, a resonant path, that is tuned to the normal frequency of the alternating current, is provided in shunt relation to the measuring instrument to divert the alternating current from the meter. To further ensure that alternating currents of normal frequency shall not traverse the meter, an anti-resonant path is provided in series with the meter. With this arrangement, the alternating ground current will not traverse the meter and, consequently, the latter will not become overheated when used in connection with a normally operating circuit.

The single figure of the accompanying drawings is a diagrammatic view of an electric circuit embodying my invention.

An alternating-current circuit 1 is supplied with energy from a plurality of generators 2 the voltage of which is determined by measuring instruments (not shown) that are connected, through potential transformers 3, to the various generator conductors. In order to determine the insulation resistance between the circuit 1 and ground, an insulation-resistance measuring device 4 is provided.

The neutral points of the primary windings of the transformers 3 are connected to a conductor 5 which, in turn, is connected, through a switching device 6, to the measuring device 4. The measuring device 4 comprises a milliammeter or volt meter 7 that is calibrated in megohms and a source 8 of direct-current electromotive force of a known value. The meter 7 and the source 8 are connected in series between the ground 9 and the conductor 5 and thus, when the knife-blade members 10 and 11 of the switching device 6 are thrown to their upper positions, the resistance of the path between the circuit 1 and the ground may be determined by applying Ohm's law.

If a ground occurs on the system 1 while the measuring device 4 is connected in circuit, alternating current will traverse the latter and thus injure the instrument 7 by reason of its overheating. To prevent overheating of the instrument 7 and to permit the same to be connected in circuit under all conditions, a resonant path 12, comprising a condenser 13 and a reactor 14, is connected in shunt relation to the device 4. The path 12 is tuned to the normal frequency of the current traversing the circuit 1, whereby alternating current that would normally traverse the instrument 7, upon occurrence of a ground, will be shunted through the path 12. To further ensure that no alternating current shall traverse the instrument 7, an anti-resonant path 15, comprising a reactor 16 and a condenser 17, connected in parallel, is connected in series with the instrument 7 and is so tuned that current circulates in the same under normal frequency conditions and thus does not traverse the instrument 7.

A known resistor 18 is connected between the ground and one of the contact members 19 of the switching device 6 for the purpose of checking the indications of the instrument 7 when desired. If it is desired to disconnect the device 4, it is only necessary to open the knife-blade members 10 and 11 and cause the knife-blade member 10 to engage the stationary contact member 20 which is connected to ground.

My invention is not limited to the specific arrangement illustrated, as it may be variously modified without departing from the spirit and scope of the invention, as set forth in the appended claims.

I claim as my invention:

1. The combination with a high-voltage alternating-current power circuit and a transformer operatively connected thereto, of an insulation-testing instrument, a source of direct current and an anti-resonant path connected in series-circuit relation between a neutral point in the transformer and ground, and a resonant path connected in shunt relation to said series circuit.

2. The combination with a high-voltage alternating-current circuit and a transformer operatively connected thereto, of an insulation-testing instrument and a source of direct current connected in series relation, a resonant path tuned to the normal frequency of said alternating-current circuit connected in shunt relation to said instrument and said direct-current source, a path tuned to anti-resonance with respect to said alternating current circuit connected in series relation to said instrument and said direct-current source, a resistor, a switch that in one position connects a neutral point of the transformer to ground, and a second switch that in one position connects said resistor in circuit with said instrument and said direct-current source, both of said switches having operative positions in which a circuit is formed between the neutral point in the transformer and ground through the resonant and anti-resonant paths and through the instrument and said direct-current source.

3. The combination with a high-voltage alternating-current circuit and a transformer operatively connected thereto, of a circuit including an instrument and means for preventing alternating-current traversing the instrument, and means for selectively connecting the neutral point of said transformer to ground directly or through said instrument circuit.

4. The combination with a high-voltage alternating-current circuit and a plurality of transformers operatively connected thereto, of a conductor, means for severally connecting the neutral points of said transformers to said conductor, a circuit including an instrument and means for preventing alternating current traversing the instrument, and means for selectively connecting said conductor to ground directly or through said instrument circuit.

5. The combination with a high-voltage alternating current circuit and a plurality of transformers operatively connected thereto, of a conductor, means for severally connecting the neutral points of said transformers to said conductor, a circuit including an instrument and means for preventing alternating current traversing the instrument, a resistor, and means for selectively connecting said conductor to ground directly or through said instrument circuit and for connecting the resistor to said instrument circuit when the latter is disconnected from the conductor.

6. The combination with a high-voltage alternating-current circuit and a transformer operatively connected thereto, of an insulation-testing instrument and a source of direct current connected in series relation, a resonant path tuned to the normal frequency of said circuit connected in shunt relation to said instrument, and said source, a path tuned to anti-resonance with respect to said circuit connected in series relation to said instrument and said source, a resistor, and switching means for connecting a neutral point of the transformer to ground and connecting said resistor in circuit with said instrument and said source, said means also operating to effect a circuit between the neutral point of the transformer and ground through said paths and through the instrument and said source.

7. The combination with a high-voltage alternating-current circuit and a plurality of transformers operatively connected thereto, of a conductor, means for severally connecting said transformers to said conductor, an insulator-testing instrument and a source of direct-current connected in series relation, a resonant path tuned to the normal frequency of said circuit connected in shunt relation to said instrument and said source, a path tuned to anti-resonance with respect to said circuit connected in series relation to said instrument and said source, a resistor, a switch that in one position connects said conductor to ground, and a second switch that in one position connects said resistor in circuit with said instrument and said source, both of said switches having operative positions in which a circuit is formed between said conductor and ground through the resonant and anti-resonant paths and through the instrument and said source.

8. The combination with a high-voltage alternating current circuit and a plurality of generators operatively connected thereto, of a transformer connected between each generator and said circuit, a conductor, means for severally connecting the neutral points of said transformers to said conductor, an insulator testing instrument and a source of direct current connected in series relation, a resonant path tuned to the normal frequency of said circuit connected in shunt relation to said instrument and said source, a path tuned to anti-resonance with respect to said circuit connected in series relation to said instrument and said source, a resistor, a switch that in one position connects said conductor to ground, and a second switch that in one position connects said resistor in circuit with said instrument and said source, both of said switches having operative positions in which a circuit is formed between said conductor and ground through the resonant and anti-resonant paths and through the instrument and said source.

In testimony whereof, I have hereunto subscribed my name this 31st day of Oct., 1918.

LEWIS W. CHUBB.